(12) United States Patent
Erb

(10) Patent No.: US 8,606,235 B2
(45) Date of Patent: Dec. 10, 2013

(54) SYSTEMS AND METHODS FOR NOTIFICATION OF MOBILE COMMUNICATIONS DEVICE USE

(75) Inventor: Paul Andrew Erb, Ottawa (CA)

(73) Assignee: Mitel Networks Corporation, Ottawa, Ontario (CA)

(*) Notice: Subject to any disclaimer, the term of this patent is extended or adjusted under 35 U.S.C. 154(b) by 39 days.

(21) Appl. No.: 12/928,856

(22) Filed: Dec. 20, 2010

(65) Prior Publication Data

US 2012/0157046 A1  Jun. 21, 2012

(51) Int. Cl.
*H04W 12/06* (2009.01)
(52) U.S. Cl.
USPC ............ 455/411; 455/550.1; 455/435.1; 455/421; 455/422.1

(58) Field of Classification Search
USPC .............. 455/411, 456.4, 67.1, 456.1, 456.2; 370/254
See application file for complete search history.

(56) References Cited

U.S. PATENT DOCUMENTS

| | | | |
|---|---|---|---|
| 7,113,797 B2 * | 9/2006 | Kelley et al. | 455/456.2 |
| 8,355,738 B1 * | 1/2013 | Lee | 455/456.1 |
| 2002/0094784 A1 * | 7/2002 | Kashu et al. | 455/67.1 |
| 2005/0250518 A1 * | 11/2005 | Ishikawa et al. | 455/456.4 |
| 2006/0276175 A1 * | 12/2006 | Chandran | 455/411 |
| 2012/0008526 A1 * | 1/2012 | Borghei | 370/254 |

* cited by examiner

*Primary Examiner* — David Q Nguyen

(57) ABSTRACT

Described are systems and methods notifying a recipient of use of a communications device. A communications device is configured to include a parameter that indicates a condition for generating a notification. A state of the communications device is determined. The state of the communications device and the condition are compared. The notification is provided from the communications device to the recipient in response to the comparison.

4 Claims, 7 Drawing Sheets

SYSTEMS AND METHODS FOR NOTIFICATION OF MOBILE COMMUNICATIONS DEVICE USE

FIELD OF THE INVENTION

The specification relates generally to mobile communications devices, and specifically to systems and methods for generating notifications from a mobile communications device to a recipient.

BACKGROUND

Communications devices such as cellular phones, smart phones, personal digital assistants (PDAs), laptop computers, and the like, are becoming increasingly popular, especially as mobile computing technologies continue to advance. Many communications devices such as mobile devices are sufficiently small to allow users to carry them in their pockets or purses when not in use. However, small mobile devices are prone to loss or theft.

Many hotels, resorts, cruise ships, and other travel destinations loan mobile devices, for example, mobile phones, as a service offering to guests during their stay. It is not uncommon for guests to take hotel property with them when leaving the premises, especially small items such as towels, bathrobes, television remotes, etc. Mobile phones are particularly vulnerable to theft or loss due to their size and value. This is commonly referred to in the hospitality industry as a "walk-away." The time and expense associated with recovering or replacing walk-away mobile phones can be considerable.

To address this issue, hotels typically require a deposit, which is retained if the mobile phone is not returned. Deposits are generally insufficient in recovering the full cost of the lost or stolen phone.

Electronic devices can be attached to a mobile phone to activate an alarm when a guest leaves the premises with the mobile device. Alternatively, a mobile device can be rendered nonfunctional by disabling service to the device's network provider if a walk-away occurs. These approaches can lead to guest frustration. For example, a guest may inadvertently leave the hotel property with her borrowed mobile phone, and not realize her error until she is a considerable distance from the hotel. These approaches may also be ineffective in recovering borrowed mobile phones. For example, it is often difficult for the hotel to locate a guest with a walk-away mobile phone after the phone has been disabled.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
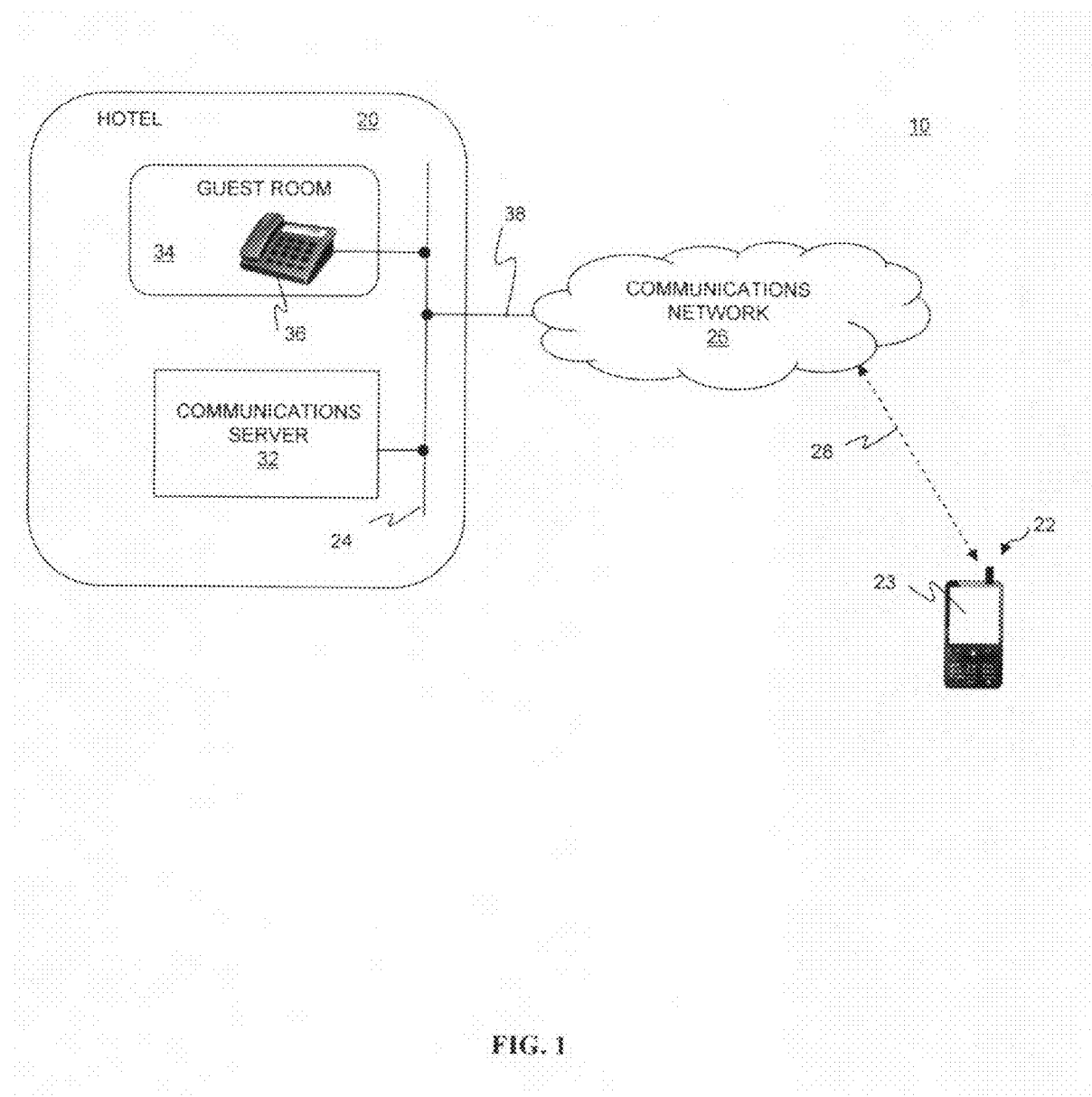
FIG. 1 is a schematic diagram illustrating a network environment in which embodiments can be practiced.

Reference will now be made to exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

A storage device can include a computer readable storage medium, which may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

In brief overview, systems and methods are disclosed that permit an electronic device to prevent a walk-away as it is occurring. This is achieved by the systems and methods generating notifications such as reminders, warnings, or other related information from a communications device to avert unauthorized use of the device. The communications device can be a mobile phone, personal digital assistant (PDA), laptop, handheld computer, pager, or other electronic apparatus. In an exemplary embodiment, a communications device provides a notification to one or more recipients to ensure that the device remains in a region defined according to configuration parameters, for example, a perimeter about a hotel property or a cruise ship.

The communications device can be configured to display a notification on the device, which is directed to the mobile device user. For example, when a user registers with or checks into a hotel as a guest, the hotel staff can provide the guest with a mobile phone, which can be used by the guest while staying at the hotel. After check-in, the mobile phone can generate a reminder message to the guest, informing the guest of hotel rules or polices regarding phone use. A reminder message can also be generated when a guest leaves the property, informing the guest that the mobile phone must remain on hotel property.

The communications device can be configured to automatically place a call, text message, or other real-time communication to one or more recipients, also referred to as a called party or a call receiver, if a guest leaves the hotel property with the device. The recipient can be an interested party, such as a hotel front desk or a security service. After the call is answered by the recipient, the communications device can send a notification message to the recipient, warning the recipient of a possible walk-away. The communications device can also place a call to the mobile phone user, and establish a two-party call between the guest and the recipient.

The communications device can also be configured to send a notification to a user that the device is subject to loss of service. For example, a hotel guest can receive a message that the mobile phone he borrowed from the hotel is no longer in communication with the hotel's phone system or cellular phone service.

Any combination of notifications can be generated. For example, several reminder messages can be generated to a mobile phone user followed by a notification message to a hotel front desk. Alternatively, a notification message can be generated from a communications device to a security service with no prior reminders. In addition, notification messages can be generated for a predetermined number of recipients, and configured for delivery to those recipients according to a predetermined order.

The systems and methods can apply to any service industry establishment, in particular, hospitality industry establishments such as hotels, resorts, casinos, cruise ships, theme parks, amusement parks, tourist locations, commercial or residential buildings, shopping centers or malls, casinos, airports, car rental services, or other service providers. The systems and methods described herein can be applied to other objects of value that are prone to intentional or accidental walk-away, for example, shopping carts at a supermarket. In these applications, the systems and methods described herein can include a processor or other electronic device that, when attached to the object, for example, a shopping cart, can generate a notification to the user or other interested party, for example, the store that owns the shopping cart.

FIG. 1 is a schematic diagram illustrating a network environment 10 in which embodiments can be practiced. The network environment 10 can include a hotel 20 having access to a communications network 26. The hotel 20 can include a communications server 32 connected to a premises-based network 24, which in turn is directly or indirectly connected to the communications network 26. The premises-based network 24 can include local area network (LAN), a wide area network (WAN), or a combination thereof, or can be any other network known to those of ordinary skill in the art. The communications network 26 can be a public switched telephone network (PSTN), cellular or other mobile communications network, data network, satellite network such as the Global Positioning System (GPS), or a combination thereof, or any other network known to those of ordinary skill in the art as being capable of transmitting voice, data, and/or video between the communications server 32, a mobile device 22, and/or other local, nationwide, or international locations.

The communications server 32 can include a business telephone system, for example, a Mitel® 3300 Integrated Communications server (ICP). The business telephone system can include a call processor, for example, a Mitel® Communications Director (MCD), or other PBX, which manages voice, video, and/or data communications between the communications server 32 and premises-based communications devices, for example, a telephone 36 in a guest room 34. A property management system (PMS) (not shown) can communicate with the communications server 32 to provide hospitality-related services, such as guest bookings, reservation control, centralized accounting and billing, and call logging.

A plurality of communications devices such as telephones, computers, facsimile machines, etc. are connected to the premises-based network 24 at various locations throughout the hotel 20. One such communications device is a guest room telephone 36, which can be an analog telephone, digital telephone, or Internet Protocol (IP) telephone, WiFi device, or other type of telephone, for example, a Mitel® 4000 phone. The communications devices can be connected to the premises-based network 24 via connections known to those of ordinary skill in the art, for example, a standard telephone line, cable, LAN, WAN, broadband, or wireless connection. Real-time or stored voice, video, and/or data can be exchanged between the communications server 32 and the communications devices via the premises-based network 24 and/or the communications network 26.

The mobile device 22 can be a mobile phone, personal digital assistant (PDA), laptop or handheld computer, pager, or other communications device that establishes electronic communication, including voice, video, and/or data, with one or more other communications devices. The mobile device 22 can communicate via connections 28, 38 with one or more other communications devices in the hotel 20, for example, the guest room telephone 36, via the data network 24. The mobile device 22 can communicate via the connection 38 with one or more communications devices, for example, computers, mobile phones, etc., which are geographically separate from the hotel 20 and the mobile device 22.

The mobile device 22 includes a notification system that is configured to generate notifications. The mobile device 22 can include a display screen 23, speaker, or other output for receiving a notification. The mobile device 22 can place a call to a recipient, and provide a notification to the recipient when the recipient answers. A call recipient can be a hospitality agent such as a hotel representative, or a mobile device service provider, a security service, a law enforcement agency, or other interested party. The mobile device 22 when configured with the notification system can communicate with the communications server 32 to generate notifications and/or place calls to recipients receiving such notifications. In other embodiments, the mobile device 22 communicates with elements of the communications network 26 to perform the features and functions described herein, for example, a session initiation protocol (SIP) proxy server external to the hotel 20, which is located in the communications network 26. In other embodiments, the systems and methods can perform the features and functions described herein with no required communication with the communications platform or system.

The communications server 32, the guest room telephone 36, and the mobile phone 22 can communicate with each other in accordance with well-known communication protocols, such as SIP or the Mitel IP protocol (MiNET), and/or in accordance with well-known feature access codes. For example, the hotel communications server 32 can include a SIP-compliant PBX, and the guest room telephone 36 and/or mobile device 22 can include SIP-compliant agents.

The communications server 32 can be configured to include telephony features known to those of ordinary skill in the art. Such features can include external hot desk user (EHDU) support and/or personal ring groups (PRG), which permit a telephone user to call a hotel guest by dialing a single phone number, for example, the extension number assigned to the guest room telephone 36, whereby the communications server 32 automatically rings other phones of choice to the guest such as the mobile device 22. Thus, an inbound call to the guest room telephone 36 can be received by the mobile device 22.

Figure 2:
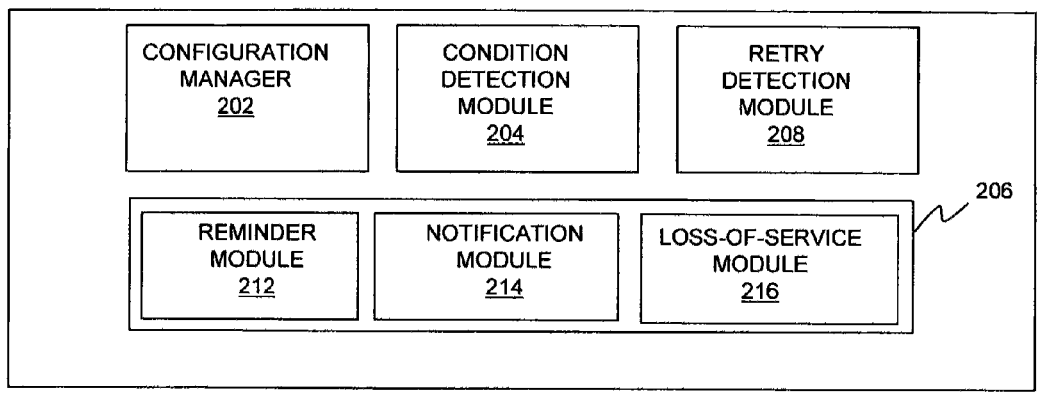
FIG. 2 is a block diagram of an embodiment of a notification system.

FIG. 2 is a block diagram of an embodiment of a notification system 200. The notification system 200 can execute entirely on the mobile device 22, or some elements of the notification system 200 can execute on the mobile device 22, while other elements execute on a remote computer such as the communications server 32. The notification system 200 can include hardware, software, firmware, or a combination thereof. The notification system 200 can be pre-installed on the mobile device 22, or downloaded to the mobile device 22, for example, from the communications server 32.

The notification system 200 includes a service interface, a configuration manager 202, a condition detection module 204, a communications module 206, and a retry detection module 208.

The configuration manager 202 includes a set of configuration parameters, which establishes conditions under which the mobile device 22 generates notification messages. In one embodiment, the configuration parameters are downloaded to the notification system 200. In another embodiment, the configuration parameters are provided to the notification system 200 by a user who inputs the configuration parameter from a touch-screen or other mobile device input in communication with the service interface. The configuration parameters can be downloaded to the configuration manager 202 upon registration of the mobile device 22 with the communications server 32, for example, at the time of check-in by the guest. The configuration parameters can be downloaded to the mobile device 22 via a download session managed according to a communications protocol, for example, a SIP connection between the communications server 32 and the mobile device 22. The communications server 32 can include bulk provisioning features, thereby allowing the configuration parameters to be downloaded from the communications server 32 to several devices.

The configuration parameters can be stored in a data repository of a storage device in the configuration manager 202. The configuration parameters can include one or more notification parameters that define one or more reminder conditions for generating a reminder message from the mobile device 22. A reminder condition can establish that a hotel guest receives a reminder message regarding hotel rules pertaining to mobile device use if the guest checks into the hotel 20 and receives the mobile device 22 from the hotel 20. Another reminder condition can establish that a guest receives a reminder message to return the mobile device 22 to the hotel 20, or to remain on hotel property, if the guest leaves the hotel 20.

The configuration parameters can include notification parameters that define notification conditions for generating a notification message or warning message. For example, a notification condition can establish that the mobile device 22 is to automatically place a call to a hotel security representative and provide a notification message to the representative if the mobile device 22 is removed from the hotel 20. In another example, a notification condition can establish that if a guest on a cruise ship uses his cabin key to disembark, then the mobile device 22 is to send a notification message to cruise ship staff indicating that the guest is leaving the cruise ship with the mobile device 22. Another notification condition can establish that, after a notification message is generated, a two-party call setup is to be generated, for example, using call features of the mobile device 22, whereby a second call is made to the mobile device 22 and a bidirectional communication path is formed so that the security representative can communicate directly with the guest.

The configuration parameters can include notification parameters that define loss-of-service conditions for generating a loss-of-service message. For example, a loss-of-service condition can establish that if the mobile device reception signal is less than a threshold signal strength level for a predetermined period of time, then a message is to be provided to the mobile device user indicating that the reception signal between the mobile device and the device's service provider is weak or lost.

The configuration parameters can define a retry interval between call attempts, or between retries. The configuration parameters can also define a number of retries. The number of retries can be set for an unlimited number of retries until the call is answered or acknowledged by the called party. The configuration parameters can define a retry sequence when more than one notification destination is configured. For example, configuration parameters can include a retry interval of 10 seconds, an unlimited number of retries, and a sequence of retries between multiple notification destinations configured as four consecutive call attempts to the first destination, followed by two call attempts to a second destination, followed by a single call attempt to a third destination. The configuration parameters can further establish that the sequence of call attempts is to be repeated until a notification is delivered, or until the device battery is exhausted.

Other configuration parameters can be configured to instruct the mobile phone 22 to call one or more destination phone numbers, SIP addresses, SMS or text destinations, etc. when a condition occurs. Other configuration parameters can define the sequential order in which recipients can be called. For example, a configuration parameter can establish that if the notification system 200 detects a walk-away condition, then the mobile device 22 is to place a first call to the user's business phone and, if there is no answer, then the mobile device 22 is to place a second call to the hotel security office.

The configuration parameters can include one or more messages to be provided in response to an abovementioned condition. The messages can be reminder messages, notification messages, loss-of-service messages, or other messages related to use of the mobile device 22. The messages can be in the form of prerecorded greetings, machine-generated greetings, text messages, email messages, text-to-speech messages, or any combination thereof. The messages can be audio and/or video messages, and stored in a file format, for example, a waveform (WAV) or MP3 format. Optionally, the messages can be provided as stored text messages, for example, SMS messages. The messages can be stored in a data repository in the mobile device 22. Multiple messages can be organized according to recipient. For example, when multiple recipients are identified for receiving notifications, one or more messages can be associated with each recipient in the data repository.

Configuration parameters can include one or more condition detection parameters. Condition detection parameters can be compared to a current state of the mobile device 22 to determine a type of notification to be provided.

Condition detection parameters can include a check-in indication parameter, which defines a condition that if a guest checks into the hotel 20 and receives the mobile phone 22, a check-in reminder message is to be provided. Condition detection parameters can include a check-out indication parameter, which defines a condition that if a guest checks out of the hotel 20, a check-out reminder message is to be provided.

Condition detection parameters can include a signal strength parameter, which defines a threshold signal strength level. The threshold signal strength level can be compared with a current signal strength of the mobile device 22 to determine whether a notification message or loss-of-service message is generated. Condition detection parameters can include a duration of time when the current signal strength level is less than the threshold signal strength level.

Condition detection parameters can include a keep-alive indication parameter, which defines a time period between which a keep-alive message is sent from either the mobile device 22 or the communications server 32 to the other of the mobile device 22 or the communications server 32. A condition can be established that if a keep-alive message is not received within the predefined time period, or if an acknowledgement is not received after multiple retransmissions of the keep-alive message, then a notification is to be provided and/or the mobile device 22 is to automatically place a phone call to a recipient Condition detection parameters can include a device mishandling parameter, which defines a threshold number of drops or mishandling incidents related to the mobile device 22. For example, the device mishandling parameter can be configured for three mishandling incidents. A condition can be established that if the mobile device 22 is dropped three times, then a notification is to be provided and/or the mobile device 22 is to automatically place a phone call to a different notification destination specifically associated with this condition.

The condition detection parameters can include a predetermined interval parameter, which defines a threshold interval after a condition has occurred, such as a condition described herein. The configuration parameters can define a condition that includes the predetermined interval parameter, whereby a notification is to be provided and/or the mobile device 22 is to automatically place a phone call to a called party upon expiration of the threshold interval. An interval parameter can also define a time interval between two events during which a current state or condition of the mobile device 22 is determined.

The condition detection module 204 compares a current state of the mobile device 22 and the configuration parameters described herein, and generates an event signal to the communications module 206. The communications module 206 in turn outputs a notification message in response to the event signal. Different event signals can be generated, depending on the comparison. Accordingly, different notification messages can be produced, depending on the notification signal.

Current state information can be provided to the condition detection module 204 from a source that is external to the mobile phone 22. For example, a check-in indication or check-out indication described herein can be provided to the condition detection module 204 from a property management system (PMS) or communications server 32 in the hotel 20. Externally-supplied current state information can be provided to the condition detection module 204 in a SIP or MiNET message, or other communication protocol supported by the mobile device 22 and the external source, for example, the communications server 32. Current state information can also be provided to the condition detection module 204 from mobile phone diagnostics, a GPS receiver in the mobile device 22, or other hardware or software components of the mobile phone 22.

The current state of the mobile device 22 can include the geographical location of the mobile device 22. The mobile device 22 can be configured with a location detection system, for example, a GPS receiver, that communicates with a location provider, for example, GPS, to receive location information regarding the mobile device 22. The condition detection module 204 can compare the location information and a location threshold parameter to determine whether the mobile device 22 is outside of a predetermined region or perimeter defined in the location threshold parameter.

The current state of the mobile device 22 can include the physical condition of the mobile device 22. The condition detection module 204 can determine the current physical condition by receiving diagnostic information on the mobile device 22. If the diagnostic information indicates that the mobile device 22 was dropped or mishandled, then this information can be compared to the configuration parameters, for example, a device mishandling parameter. A notification signal can be generated if the comparison determines that the mobile device 22 was dropped, mishandled, or otherwise damaged.

The condition detection module 204 can generate a reminder event signal in response to a comparison between a current state of the mobile device 22 and the configuration parameters. For example, the condition detection module 204 can compare a check-in signal provided by a hotel property management system to a check-in indication parameter and generate a check-in reminder event signal in response to the comparison. In another example, the condition detection module 204 can compare a check-out signal to a check-out indication parameter, and generate a check-out reminder event signal in response to the comparison. As a result, the condition detection module 204 sends a reminder event signal to the communications module 206, which generates a reminder message in response to the reminder event signal.

The condition detection module 204 can generate a warning event signal in response to a comparison between a current state of the mobile device 22 and the configuration parameters. For example, the condition detection module 204 can detect that a hotel guest placed an unauthorized phone call from the mobile device over 25 miles from the hotel. This information can be compared to a location threshold parameter which defines a condition that a notification message is to be generated if the mobile device is located more than 20 miles from the hotel property. The condition detection module 204 sends a warning event signal to the communications module 206 in response to this comparison, which in turn generates a notification message corresponding to the warning event signal.

The condition detection module 204 can generate a loss-of-service event signal in response to a comparison between a current state of the mobile device 22 and the configuration parameters. For example, the condition detection module 204 sends a loss-of-service event signal to the communications module 206 if it is determined that a current reception signal strength of the mobile device 22 is of a strength and duration that are less than a threshold strength and duration defined in the configuration parameters.

The communications module 206 receives an event signal generated by the condition detection module 204 and outputs a notification message corresponding to the event signal. The type of notification message generated depends on the type of event signal received by the communications module. The communications module 206 comprises a reminder module 212, a notification module 214, and a loss-of-service module 216 that can receive the reminder event signal, the warning event signal, and the loss-of-service event signal, respectively.

The reminder module 212 generates a reminder message corresponding to the reminder event signal. For example, the condition detection module 204 can generate a check-in reminder message in response to a check-in reminder event signal.

The reminder module 212 can output the check-in reminder message to the mobile device display 23, speaker, or other output after initiating a call to the mobile device 22 in response to the reminder event signal. The notification system 200 can initiate the call, which is received by the mobile device 22. The call can be initiated by establishing a SIP call session. The reminder message can be output in response to the SIP call session.

The notification module 214 can generate a notification message, a call to one or more predetermined recipients, or a combination thereof, in response to a warning event signal. The notification message can be a prerecorded greeting, text message, or other message similar to those described herein.

The notification module 214 can be configured to call one or more call recipients according to the configuration parameters. For example, the notification module 214 can be configured to call a recipient at an internal extension, a local number, a toll-free number, and/or an international number according to the conditions set forth in the configuration parameters. One or more recipients can be called in accordance with a calling sequence defined by the configuration parameters. The notification module 214 can also initiate the call to the mobile device 22, and establish a two-party call between the user and the recipient. The notification module 214 can place telephone calls, SIP calls, or other calls to the recipient and/or the mobile device user that are known to those of ordinary skill in the art. The two-party call can be generated using conference features of the mobile device 22. The two-party call can alternatively be performed using supervised transfer or unsupervised transfer features.

The loss-of-service module 216 receives a loss-of-service event signal from the condition detection module 204 and generates a loss-of-service message corresponding to the loss-of-service event signal. The loss-of-service message can be the same as or similar to other messages described herein.

The retry detection module 208 can compare retry parameters to current retry conditions. The retry detection module 208 can include a retry delay timer that measures retry delays. The retry detection module 208 can further comprise a retry counter that counts a number retry attempts. The retry delay timer and the retry counter are cleared after a call is answered and a reminder message or notification is message is played. With regard to loss-of-service conditions, the retry delay timer and the retry counter are not cleared after a call is answered so long as the loss-of-service condition exists. As a result, if the mobile device 22 loses service, a call can be initiated periodically according to the configuration parameters and a loss-of-service message can be provided so long as the mobile device is turned on.

Figure 3:
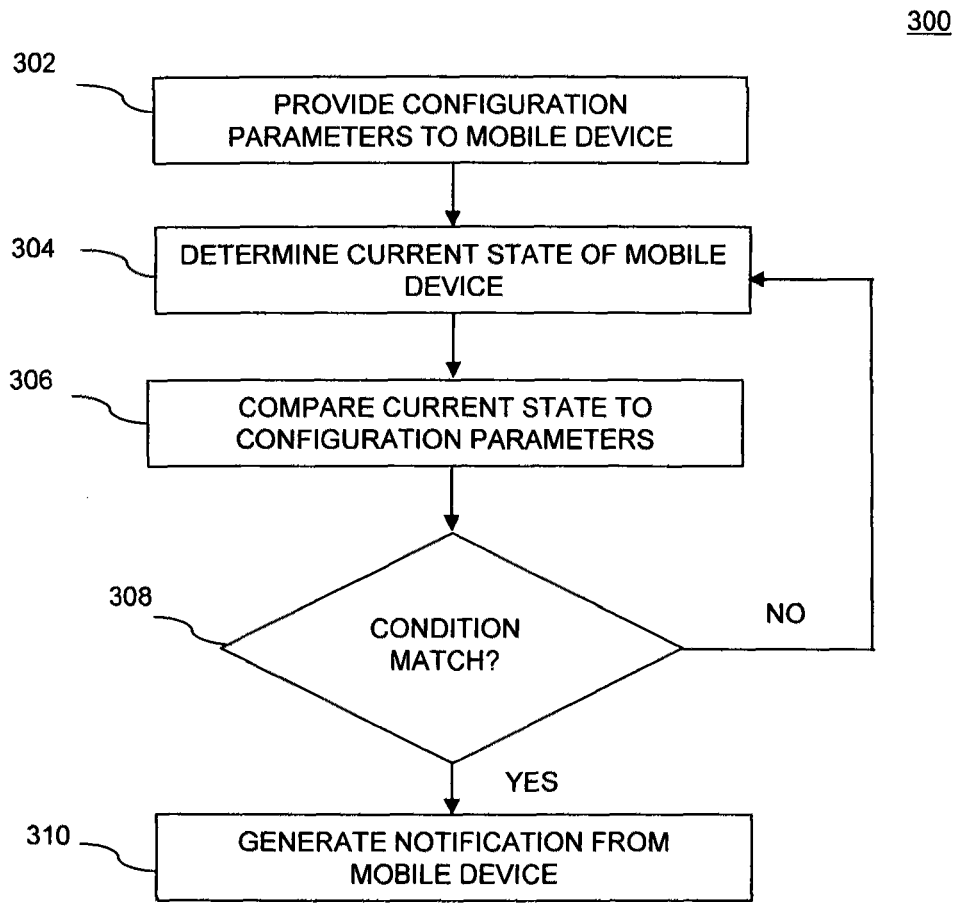
FIG. 3 is a flowchart depicting an embodiment of a method for notification of unauthorized mobile device use.

FIG. 3 is a flowchart depicting an embodiment of a method 300 for notification of unauthorized mobile device use. The method 300 can be implemented, for example, in the mobile device 22 described herein. Accordingly, in describing the method 300, reference is also made to FIGS. 1 and 2.

The method 300 commences with configuration parameters provided 302 to the mobile device 22. The configuration parameters can be downloaded via wireless communication to the mobile device 22 from a server, for example, a SIP proxy server, or from a data repository. Alternatively, the configuration parameters can be entered into the mobile device 22 by a user via a touch-screen user interface or other input device.

The current state of the mobile device 22 is determined 304. The current state can be determined from information provided externally to the mobile device 22, for example, via a check-in indication or a check-out indication. The current state can be determined from diagnostic information or other indicators provided by the mobile device 22. Current state information can include location information, physical condition information, connection information, or a combination thereof.

The current state of the mobile device 22 is compared 306 to the configuration parameters to determine if a notification is to be generated. For example, a current location of the mobile device 22 can be compared to a location threshold parameter that establishes a maximum permissible distance from the hotel 20. If a condition match 308 occurs, for example, if the mobile device 22 is determined to be located a distance from the hotel that is greater than the maximum threshold distance, then a notification is generated 310 from the mobile device 22. If there is no condition match 308, the current state of the mobile device 22 is again determined 304. The notification can be a message to the mobile device user. The notification can be a call to one or more predetermined recipients and/or a message to those recipients.

In one embodiment, the condition match 308 can produce a reminder event signal similar to or the same as the reminder event signals described herein. The notification can be a reminder message produced in response to the reminder event signal. In another embodiment, the condition match can produce a warning event signal similar to or the same as the warning event signals described herein. The notification can be a notification message, phone call to a recipient, warning, and the like produced in response to the warning event signal. In another embodiment, the condition match can produce a loss-of-service event signal similar to or the same as the loss-of-service event signals described herein. The notification can be a loss-of-service message produced in response to the loss-of-service event signal.

Figure 4:
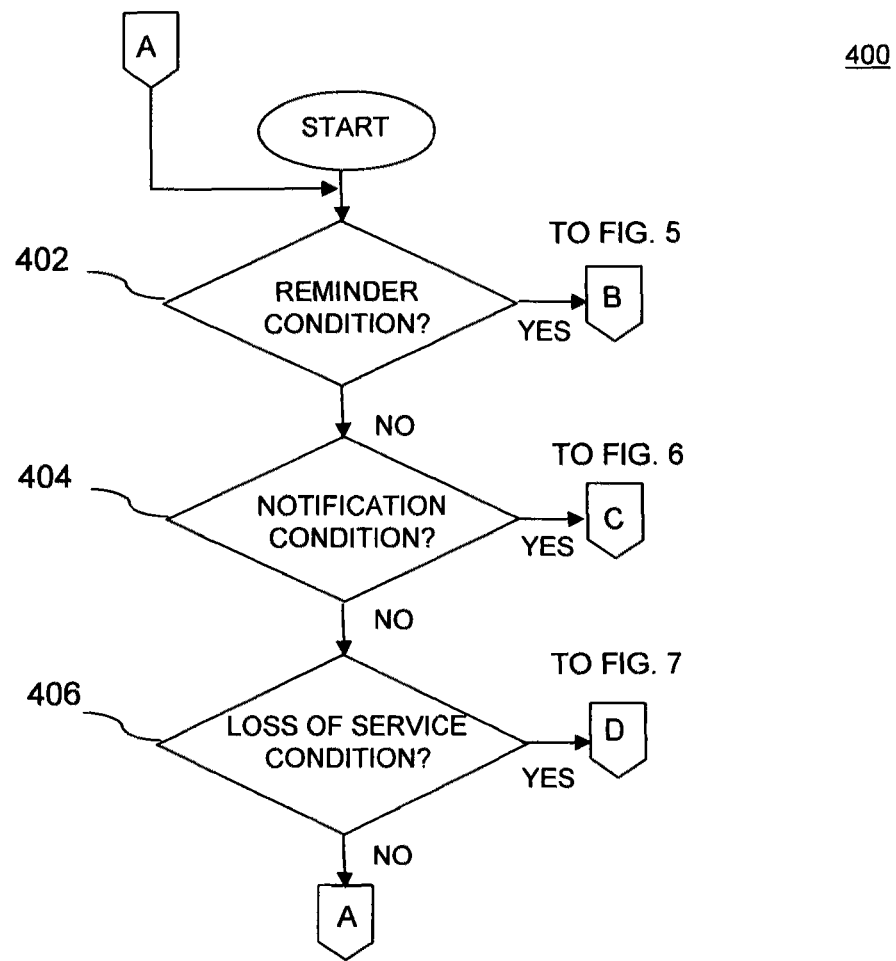
FIG. 4 is a flowchart depicting an embodiment of a method for detecting a condition.

FIG. 4 is a flowchart depicting an embodiment of a method 400 for condition detection. The method 400 can be used in conjunction with method 300, for example, implemented prior to step 306. The method 400 can be implemented, for example, in the mobile device 22 described herein. Accordingly, in describing the method 400, reference is also made to FIGS. 1-3.

Figure 5:
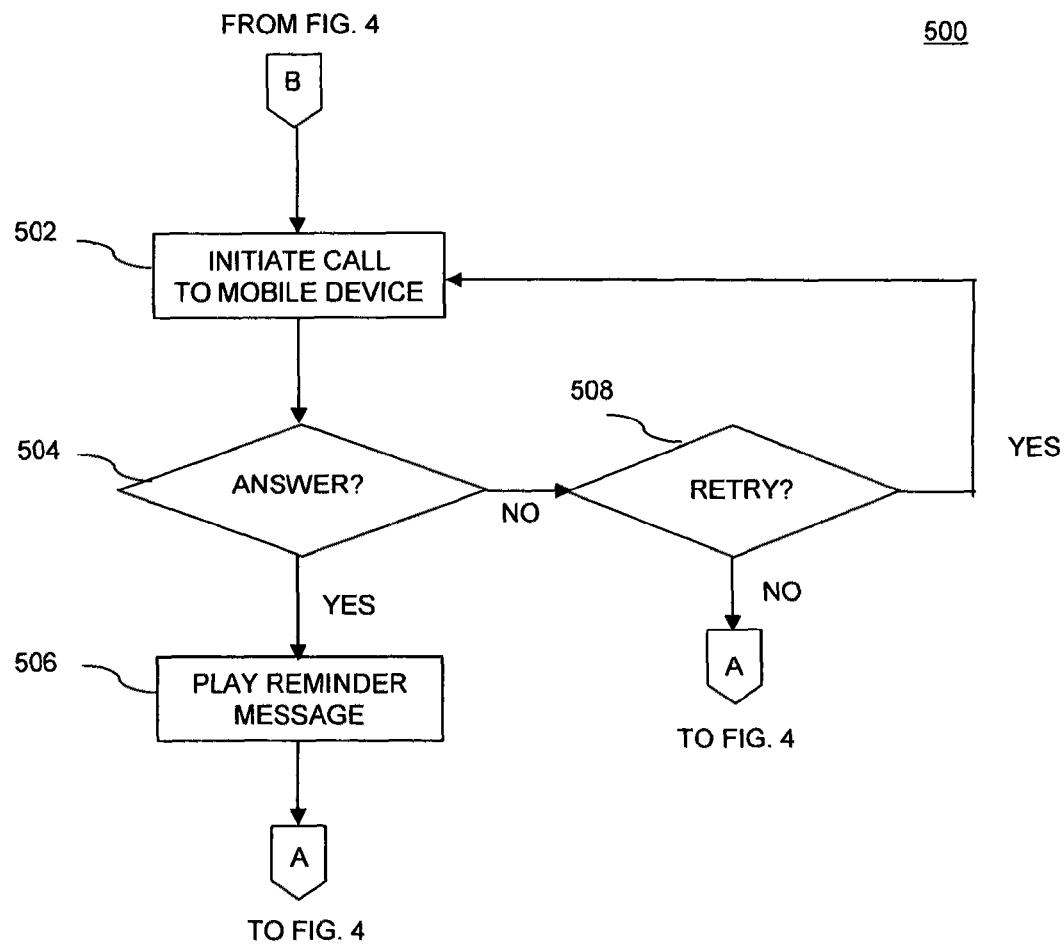
FIG. 5 is a flowchart depicting an embodiment of a method for generating a reminder message.

A determination is made as to whether a reminder condition 402 is met. For example, a check-in signal can be generated from a hotel property management system (PMS), satisfying a reminder condition that a guest has checked in. If a reminder condition is met, then a method for generating a reminder message can be performed as shown in FIG. 5.

Figure 6:
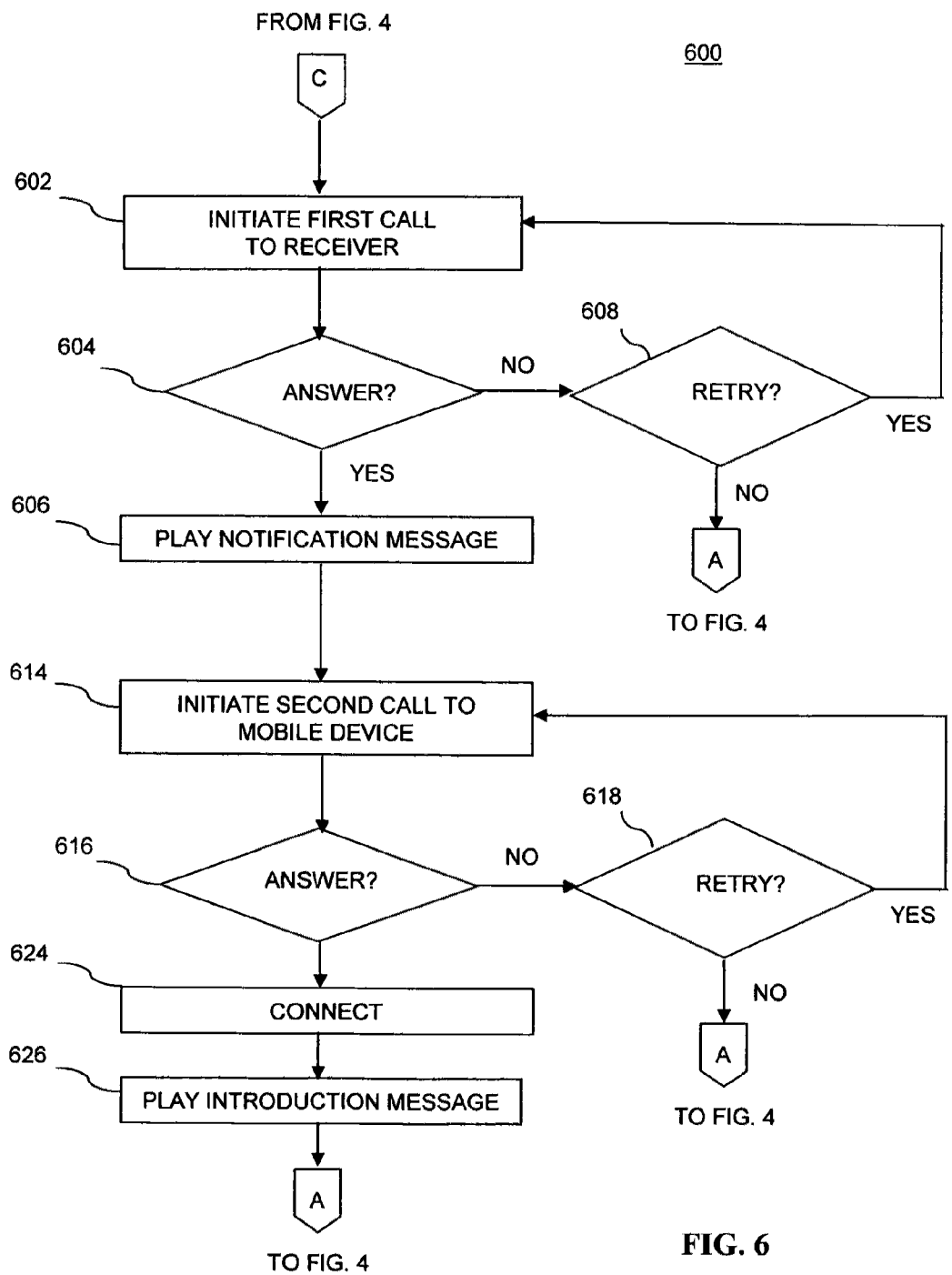
FIG. 6 is a flowchart depicting an embodiment of a method for generating a notification message.

If a reminder condition is not met, then a determination is made as to whether a notification condition 404 is met. For example, a condition can be to place a call to a predetermined hotel representative if the mobile device 22 is no longer on the property, followed by a notification message to the hotel security representative. If the notification condition is met, the method for generating a notification message can be performed as shown in FIG. 6.

Figure 7:
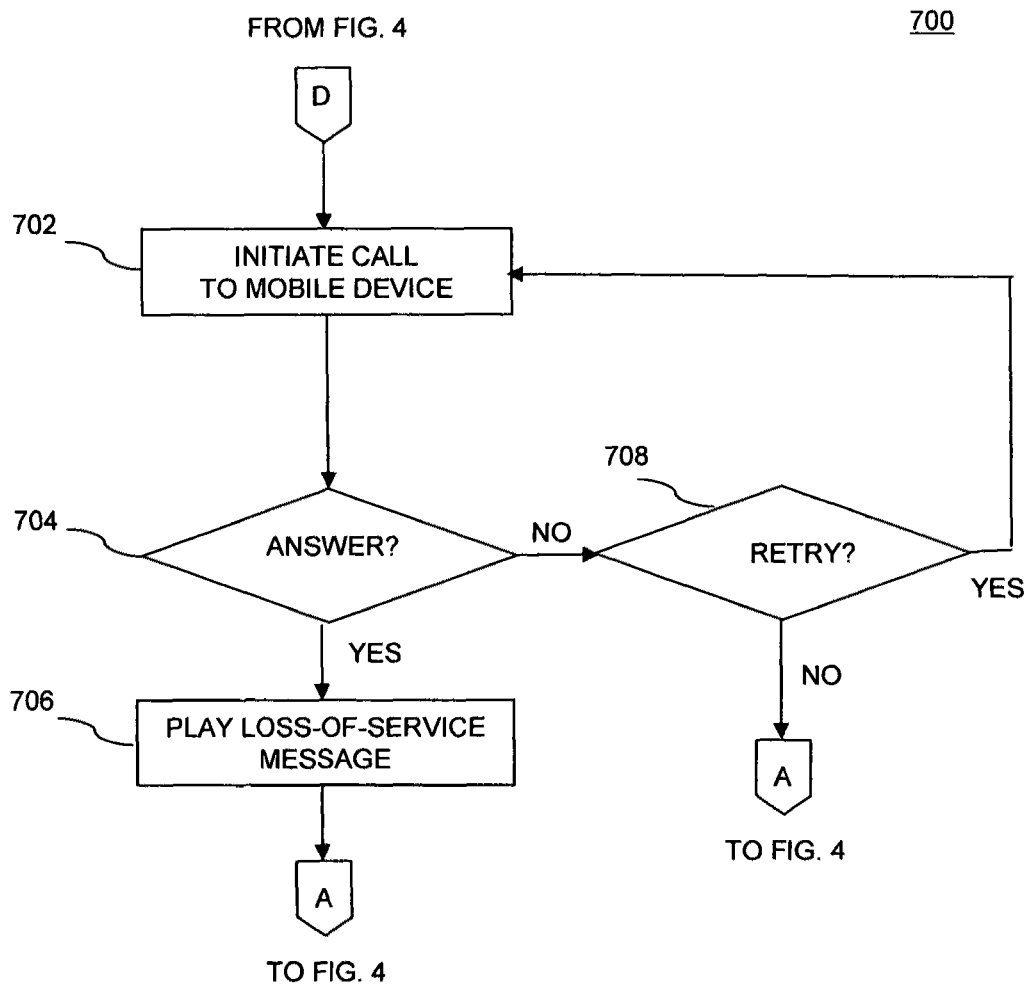
FIG. 7 is a flowchart depicting an embodiment of a method for generating a loss-of-service message.

If a notification condition is not established, then a determination is made as to whether a loss-of-service condition 406 is met. For example, a condition can be to generate a loss-of-service message if a phone reception signal is below a threshold signal strength level. If the loss-of-service condition is met, then a method for generating a loss-of-service message can be performed as shown in FIG. 7. If a loss-of-service condition is not established, then the method loops back to the start of the method. The method 400 can further include providing time delays between the reminder condition determination, the notification condition determination, the loss-of-service condition determination, and/or the loop back between the loss-of-service condition and the start of the method.

In an embodiment shown in FIG. 4, determinations are made regarding a reminder condition, a notification condition, and a loss of signal condition. However, the sequence of determinations can be different. For example, a determination can be first made as to whether a loss-of-service condition is established.

FIG. 5 is a flowchart depicting an embodiment of a method 500 for generating a reminder message. The method 500 commences with the receipt of a reminder event signal, for example, generated in response to the reminder condition 402.

A call is initiated 502 to the mobile device 22 in response to the reminder event signal. The call can be initiated from the mobile device 22 and placed to itself, for example, on a prime line. The mobile device 22 can include telephony signaling protocols known to those of ordinary skill in the art such as SIP, which can simulate an inbound call to the mobile device 22. A line appearance can be used on the mobile device 22 to receive the incoming call A determination is made if the call is answered 504. If the call is not answered, then a retry 508 is performed, and a call is again placed 502 to the mobile device 22. The retry 508 can be performed according to one or more configuration parameters, in particular, a retry interval, a retry delay timer, a retry count parameter, and/or other related parameters. For example, the retry count parameter can include a maximum number of retries. A retry counter can provide a current number of retry attempts. If the number of retry attempts is less than the maximum number of retries defined in the retry count parameter, then a call is initiated 502 again to the mobile device 22. Otherwise, the method loops back to the start of the method 400.

If the mobile device user answers 504 the call, then a reminder message is played 506. The reminder message can be a video and/or audio recording, for example, a WAV or MP3 file. The reminder message can be a text message, for example, an SMS message displayed on a mobile phone screen. The mobile device user can acknowledge the call and/or reminder message using feature access codes, softkey prompts, or other response indicators.

FIG. 6 is a flowchart depicting an embodiment of a method 600 for generating a notification message. The method 600 commences with the receipt of a warning event signal, for example, generated in response to the notification condition 404.

A first call is initiated 602, and placed to a notification destination, for example, the hotel front desk. The call can be automatically placed as a phone call to a destination phone number. Alternatively, this can be a SIP call or other call type defined in the configuration parameters of the notification system.

If the destination phone number answers 604 the call, then a notification message is played 606. The notification message can be a video and/or audio recording, for example, a WAV or MP3 file. The notification message can be a text message, for example, an SMS message displayed on a mobile phone screen. If there is no answer, a retry 608 is performed where a call is again placed to the mobile device 22. Retry parameters of the retry 608 can be the same as or similar to those of the retry 508 of method 500. If the number of retries is less than a maximum number of retries defined in the retry parameters, a call is initiated 602 again to the mobile device 22. Otherwise, the method loops back to the start of the method 400.

The notification message 606 can include a warning to the recipient of a possible walk-away. The notification message 606 can also inform the recipient that the recipient will be put on hold and will be subsequently connected with the mobile device user.

Upon completion of the notification message 606, a second call is initiated 614 to the mobile device 22. The call can be initiated from the mobile device 22 and placed to itself, for example, on a second line. The mobile device 22 can include telephony signaling protocols known to those of ordinary skill in the art such as SIP, which can simulate an inbound call to the mobile device 22.

If the mobile device user answers 616 the call, then the user can be connected 624 with the recipient, for example, by establishing a two-party call between the user and the call recipient. The two-party call can be generated using conference features of the mobile device 22. The two-party call can alternatively be performed using supervised transfer or unsupervised transfer features.

An introduction message can be played 626. Alternatively, the introduction message can be played as a notification message to the mobile device user prior to connection with the recipient, for example, where the user is notified of a call connection with the recipient. The introduction message can be played in a similar format as other notification messages, for example, WAV, MP3, text message, etc. After the introduction message is played 626, the method loops back to the start of the method 400.

If the mobile device user does not answer 616 the call, a retry 618 is performed where a call is again placed to the mobile device 22. Retry parameters of the retry 618 can be the same as or similar to those of retries 508, 608. If the number of retries is less than a maximum number of retries defined in the retry parameters, a call is initiated 614 again to the mobile device user. Otherwise, the method loops back to the start of the method 400.

FIG. 7 is a flowchart depicting an embodiment of a method 700 for generating a loss-of-service message. The method 700 commences with the receipt of a loss-of-service event indication, for example, generated in response to the loss-of-service condition 406.

A call is initiated 702 to the mobile device 22 in response to the loss-of-service event indication. The call can be initiated in a similar manner as those described in methods 500 and 600.

If the mobile device user answers 604 the call, then a loss-of-service message is played 706. The loss-of-service message can be a video and/or audio recording, a text message, or other format described herein.

If there is no answer, a retry 708 is performed where a call is again placed to the mobile device 22. The retry 708 can be performed according to a predetermined retry interval, retry delay period, or other related parameters defined in the configuration parameters. A retry count parameter can include a maximum number of retries. Retry parameters of the retry 708 can be the same as or similar to those retries described in methods 500 and 600. However, current retry delay and retry counter data are not cleared after a call is answered so long as the loss-of-service condition exists. As a result, if the mobile device 22 loses service, a call can be initiated periodically according to the configuration parameters and a loss-of-service message can be provided so long as the mobile device is turned on. If the number of retries is less than a maximum number of retries defined in the retry parameters, a call is initiated 702 again to the mobile device user. Otherwise, the method loops back to the start of the method 400.

While many of the specific examples herein have been given regarding mobile devices, the systems and methods disclosed can also be used with other electronic devices that that are co-located with, coupled to, or integrated with an object of value, for example, a shopping cart or bicycle.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for notifying one or more recipients of use of a mobile communications device, comprising:
    configuring the mobile communications device to include a set of parameters that indicate a condition for generating a notification message, the parameters defining at least one of a reminder condition, a notification condition, and a loss-of-service condition;
    storing the set of parameters in a memory of the mobile communications device;
    determining, in the mobile communications device, a state of the mobile communications device;
    comparing, in the mobile communications device, the state of the mobile communications device and the condition; and
    providing the notification message from the mobile communications device to a recipient in response to the comparison, further comprising:
communicating by the communications device with a communications server;
receiving from the communications server a request to generate the reminder message when the user registers with the communications server;
comparing the request and the condition; and
providing the reminder message to a user of the communications device.

2. The method of claim 1, further comprising:
    initiating from the communications device a connection to the recipient; and
    sending the notification message to the recipient.

3. The method of claim 2, further comprising establishing a two-party call between a user of the communications device and the recipient.

4. A mobile communications device having a notification system, the notification system of the device comprising:
    a configuration manager that includes at least one parameter that indicates a condition for generating a notification, the parameter defining at least one of a reminder condition, a notification condition, and a loss-of-service condition;
    a data repository in the configuration manager for storing the at least one parameter;
    a condition detection module that compares a state of the mobile communications device and the condition and that generates an event signal in response to the comparison; and
    a communications module that outputs a notification message to a recipient in response to the event signal, wherein the recipient is a hospitality industry establishment that provides the communications device to a user.

* * * * *